No. 636,930. Patented Nov. 14, 1899.
J. M. SWEET.
TIRE FOR VEHICLE WHEELS.
(Application filed Mar. 1, 1899.)
(No Model.)
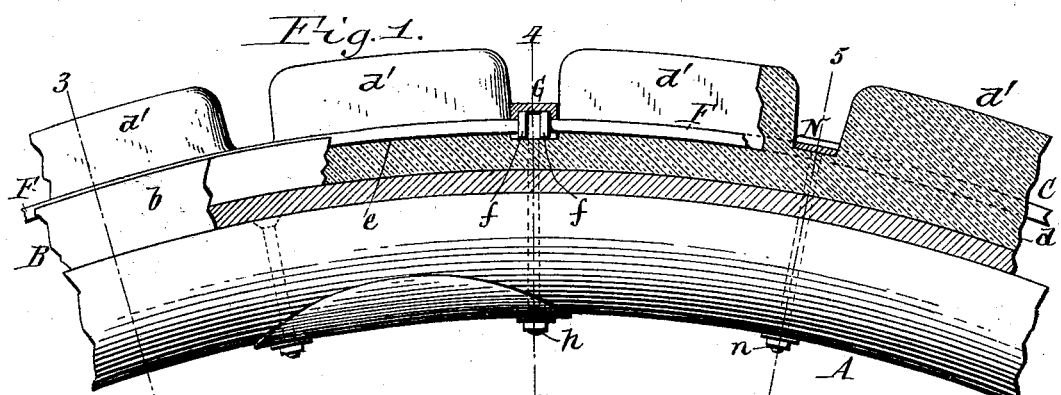
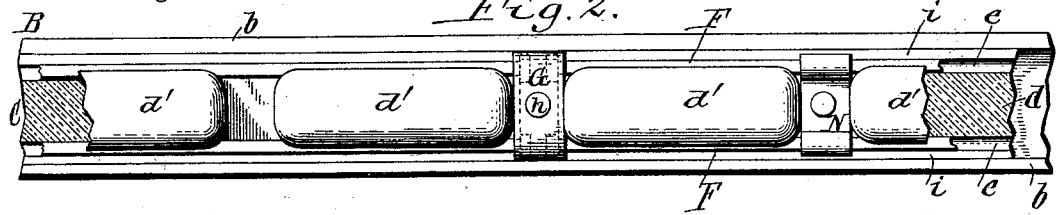
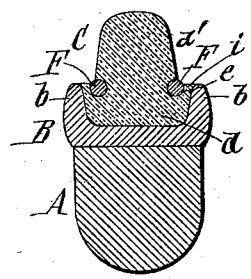
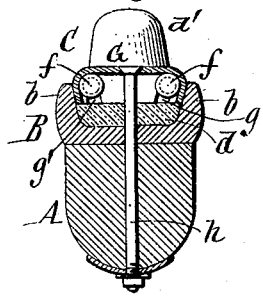
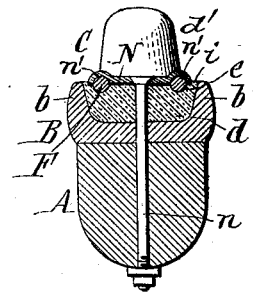
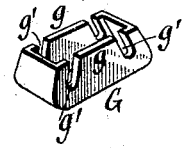
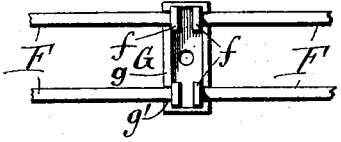
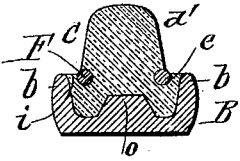
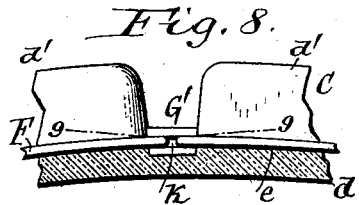
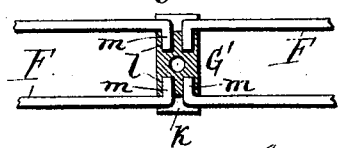
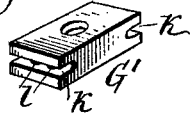
Witnesses.
Henry L. Deck.
Chas. F. Burkhart.
John M. Sweet, Inventor.
By Wilhelm Bonner,
Attorneys.

UNITED STATES PATENT OFFICE.

JOHN M. SWEET, OF BATAVIA, NEW YORK, ASSIGNOR TO FRANK RICHARDSON, TRUSTEE, OF SAME PLACE.

TIRE FOR VEHICLE-WHEELS.

SPECIFICATION forming part of Letters Patent No. 636,930, dated November 14, 1899.

Application filed March 1, 1899. Serial No. 707,275. (No model.)

*To all whom it may concern:*

Be it known that I, JOHN M. SWEET, a citizen of the United States, residing at Batavia, in the county of Genesee and State of New York, have invented new and useful Improvements in Tires for Vehicle-Wheels, of which the following is a specification.

This invention relates to rubber tires for vehicle-wheels, and mainly to that kind of rubber tires which are provided with a base by which the tire rests on the rim of the wheel and with tread-pieces which project from such base and form a non-continuous tread, although some parts of this invention are applicable also to tires with a continuous tread.

My invention has for its objects to construct the tire and the fastening devices in such manner that the tire will be held securely on the wheel and that the tire can be applied to the wheel in a simple and inexpensive manner.

In the accompanying drawings, Figure 1 is a side elevation, partly in longitudinal section, of a portion of the rim of a vehicle-wheel provided with my improvements. Fig. 2 is a top plan view of the same, partly in horizontal section. Figs. 3, 4, and 5 are cross-sections, respectively, in lines 3 3, 4 4, and 5 5, Fig. 1. Fig. 6 is an inverted perspective view of the coupling-block which connects the ends of the fastening-wires. Fig. 7 is a bottom plan view of the same, showing the ends of the wires arranged in the coupling-block. Fig. 8 is a fragmentary side elevation, partly in section, showing a modified construction of the coupling-block and fastening-wires. Fig. 9 is a horizontal section through this coupling-block in line 9 9, Fig. 8. Fig. 10 is a perspective view of this coupling-block. Fig. 11 is a cross-section of the channeled rim and the tire, showing a rib on the bottom of the channel and a corresponding groove in the tire.

Like letters of reference refer to like parts in the several figures.

A represents the wooden felly of a vehicle-wheel; B the channeled rim, of iron or steel, which is applied to the outer side of the felly, and C the rubber tire, which is arranged in the rim.

The tire C consists of a base *d*, which fits snugly in the channel of the rim, and tread projections *d'*, which are formed on the base in a longitudinal or circumferential row or series. These projections have the form of elongated blocks with rounded corners and tapering sides and are separated by intervening spaces, so that each projection is capable of individual action in yielding lengthwise and sidewise, whereby lateral vibration of the wheel is avoided.

The channeled rim B has side flanges *b*, and the base *d* of the tire extends from the bottom of the channel to the outer edges of these side flanges, or nearly so, and then inwardly to the tread projections. The latter are somewhat narrower than the base of the tire, and the base is provided on each side, at the junction of the sides of the projections with the base, with a longitudinal or circumferential groove *e*, nearly circular in cross-section, for the reception of a fastening wire or rod F. These two fastening wires or rods extend around the base of the tire in the form of divided rings and are embedded in the grooves *e* of the tire. The ends of each fastening wire or rod are secured together by a coupling-block G, which extends across the base of the tire in the space between two of the tread projections and receives both ends of both wires or rods. As shown in Figs. 1, 2, 4, 6, and 7, the ends of the wires or rods are provided with enlargements or heads *f*, and the coupling-block is recessed in its under side and has its transverse walls *g* provided in their under side with notches *g'* of the proper size to receive the fastening-wires, while the heads *f* of the latter are received in the recess of the coupling-block and bear against the rear sides of the transverse walls of the block, thereby connecting the ends of each wire or rod. The coupling-block is secured to the wheel by a bolt *h*, which passes through the coupling-block, the base of the tire, the rim, and the felly. The tire is applied to the wheel by placing the tire with its base in the channel of the rim, then placing the fastening-wires in the grooves of the tire, then drawing the ends of each wire toward each other by screw-clamps or other suitable appliances until they are so near to each other that they can be engaged with the coupling-block, then applying this block to the headed ends of the wires, and then bolting the block to the wheel. These operations can all be performed by means of ordinary tools and by workmen of ordinary skill, and the tire is by this means fastened to the wheel in a very simple and reliable manner and can be easily taken off when it is necessary to renew the tire or a portion of the same.

The fastening-wires embedded in the grooves of the tire are separated from the side flanges b of the metallic rim B by the outer side portions or lips i of the elastic base d of the tire. This prevents the fastening-wires from bearing directly against the side flanges and provides a yielding cushion-strip between each wire and the adjacent side flange of the rim, whereby the wire is more securely seated on the base of the tire. When the wires are tightened, their downward pressure on the base of the tire forces the lips i outward against the side flanges of the channeled rim, producing so close a fit that sand and other foreign matter cannot work in between the base of the tire and the side flanges.

The coupling-block which connects the ends of each fastening-wire may be constructed in various ways for engagement with the wires. For instance, as shown in Figs. 8, 9, and 10, the block G' may be provided with a groove k at each end and with two sockets l, extending inwardly from each groove, for the reception of the inwardly-bent ends m of the wire.

Sometimes it is desirable to clamp the wires down to the base of the tire and to the wheel at additional points besides that at which the ends of each wire are coupled together. In such cases a transverse fish-plate or clamping-plate N, Figs. 1 and 5, is arranged at the desired point in the space between two of the tread projections and drawn down on the wires and the base of the tire by a bolt n, passing through the plate, the base of the tire, the rim, and the felly. This plate has its end portions preferably shaped to form concave grooves n' on the under side of the plate at the ends thereof, in which grooves the wires rest.

The channeled rim B may be constructed with a central rib o and the base of the tire with a corresponding groove, as shown in Fig. 11. This rib resists lateral displacement of the tire and holds the tire more securely in place, while it does not interfere with the tightening of the fastening-wires, as the latter are located over those portions of the elastic base which lie on both sides of this rib and are of the full depth. The herein-described construction of the base of the tire and of the channeled rim with the central rib is applicable also to tires with a continuous tread, in which case the ends of the fastening-wires are united by well-known means— for instance, by brazing or electric welding.

I claim as my invention—

1. The combination with a vehicle-wheel and its channeled rim, of an elastic tire, composed of a base, seated in said rim, and a projecting tread, circumferential fastening wires or rods bearing on the base of said tire on opposite sides of the tread, and a transverse coupling-block which is arranged across the tire and connects the ends of both wires or rods on opposite sides of the tread, substantially as set forth.

2. The combination with a vehicle-wheel and its channeled rim, of an elastic tire, composed of a base, seated in said rim, and tread projections separated by intervening spaces, circumferential fastening wires or rods arranged in grooves formed in the tire on both sides of the tread projections, and a transverse coupling-block arranged between two of the tread projections and engaging with the ends of each wire, substantially as set forth.

3. The combination with a vehicle-wheel and its channeled rim, of an elastic tire, composed of a base, seated in said rim, and tread projections, circumferential fastening wires or rods arranged on opposite sides of the tread and provided with headed ends, and a transverse coupling-block, recessed on its under side for the reception of said heads and having its front and rear walls provided with notches for the reception of the wires or rods, substantially as set forth.

4. The combination with a vehicle-wheel and its channeled rim, of an elastic tire composed of a base, seated in said rim, and tread projections separated by intervening spaces, circumferential fastening wires or rods bearing upon the tire on opposite sides of the tread projections, means whereby the ends of said wires or rods are connected, and transverse clamping-plates bearing upon said wires or rods and arranged in spaces between the tread projections, substantially as set forth.

Witness my hand this 25th day of February, 1899.

JOHN M. SWEET.

Witnesses:
 JNO. J. BONNER,
 ELLA R. DEAN.